United States Patent
Rolff et al.

(10) Patent No.: US 8,416,091 B2
(45) Date of Patent: Apr. 9, 2013

(54) SNIFFING PROBE

(75) Inventors: Randolf Rolff, Kerpen-Horrem (DE); Ralf Kilian, Köln (DE); Jörn Liebich, Köln (DE); Norbert Moser, Hürth (DE); Norbert Rolff, Kerpen-Horrem (DE)

(73) Assignee: Inficon GmbH, Köln (DE)

( * ) Notice: Subject to any disclaimer, the term of this patent is extended or adjusted under 35 U.S.C. 154(b) by 0 days.

(21) Appl. No.: 11/630,502

(22) PCT Filed: Jun. 22, 2005

(86) PCT No.: PCT/EP2005/051820
§ 371 (c)(1),
(2), (4) Date: Nov. 5, 2007

(87) PCT Pub. No.: WO2006/003037
PCT Pub. Date: Jan. 12, 2006

(65) Prior Publication Data
US 2008/0223112 A1 Sep. 18, 2008

(30) Foreign Application Priority Data
Jun. 30, 2004 (DE) .......................... 10 2004 031 503

(51) Int. Cl.
*G08B 17/10* (2006.01)

(52) U.S. Cl.
USPC ............. 340/632; 73/23.2; 73/23.4; 362/119; 362/120

(58) Field of Classification Search ........ 73/23.2–31.07; 340/632, 603, 605; 362/551, 555, 557, 562, 362/572, 577, 615, 109–120; 607/93
See application file for complete search history.

(56) References Cited

U.S. PATENT DOCUMENTS

| | | | |
|---|---|---|---|
| 2,796,757 A | | 6/1957 | Peterson |
| 3,935,079 A | * | 1/1976 | Fitterer et al. .................. 346/45 |
| 4,302,797 A | * | 11/1981 | Cooper .......................... 362/119 |
| 5,214,412 A | * | 5/1993 | Gavlak et al. ................. 340/632 |
| 5,357,781 A | * | 10/1994 | Tikijian ......................... 73/19.1 |
| 6,182,497 B1 | * | 2/2001 | Krajci ............................. 73/23.2 |
| 6,362,741 B1 | * | 3/2002 | Hickox et al. ................ 340/605 |
| 6,422,061 B1 | * | 7/2002 | Sunshine et al. .............. 73/29.01 |
| 6,428,180 B1 | * | 8/2002 | Karram et al. ................ 362/119 |
| 6,491,408 B1 | * | 12/2002 | Cooper et al. ................ 362/184 |
| 6,647,761 B2 | * | 11/2003 | Barjesteh .......................... 73/40 |

(Continued)

FOREIGN PATENT DOCUMENTS

| | | |
|---|---|---|
| DE | 11 92 851 | 5/1965 |
| DE | 15 73 523 | 4/1970 |

OTHER PUBLICATIONS

International Preliminary Report on Patentability for PCT/EP05/51820.

*Primary Examiner* — Jennifer Mehmood
*Assistant Examiner* — Ryan Sherwin
(74) *Attorney, Agent, or Firm* — Harris Beach PLLC

(57) ABSTRACT

An illumination device is provided at the handle-piece of a sniffing probe, in which the illumination device illuminates the region to be inspected. This incorporation considerably facilitates handling of the sniffing probe in difficult-to-access and poorly illuminated regions, for sniffing probes used for detecting gases, for example, for detecting a gas leakage in a cooling device of a motor vehicle.

6 Claims, 2 Drawing Sheets

U.S. PATENT DOCUMENTS

| | | | |
|---|---|---|---|
| 6,840,086 B2 * | 1/2005 | McCoy et al. | 73/40.7 |
| 7,051,577 B2 * | 5/2006 | Komninos | 73/40.5 A |
| 7,159,445 B2 * | 1/2007 | Bohm et al. | 73/23.2 |
| 7,588,726 B1 * | 9/2009 | Mouradian et al. | 422/83 |
| 2002/0121973 A1 * | 9/2002 | Denietolis et al. | 340/450 |
| 2003/0079519 A1 | 5/2003 | Wilkinson et al. | |

* cited by examiner

SNIFFING PROBE

FIELD OF THE INVENTION

The invention relates to a sniffing probe comprising a handle-piece and being used for detecting a leaking gas.

BACKGROUND OF THE INVENTION

Sniffing probes are used for determining the location of gas emanation, for example a gas emanating from the cooling circuit of air conditioning units or cooling systems in vehicles and buildings. For this purpose, the sniffing probe handle-piece comprises a gas inlet opening through which ambient gas is continuously taken in, which gas is then examined with respect to the test gas. If a concentration limit value of the test gas is exceeded, said exceeding is acoustically signaled by a detection device connected to the sniffing probe, for example.

Sniffing probes are frequently used in environments which are difficult to access and poorly lit or not lit at all, for example in the engine compartment of vehicles, in narrow shafts of buildings etc. Here, rapid and exact tracing and identification of the conduits and containers to be inspected and exact localization of a leakage are difficult. Frequently, a flashlight is to be used, which is quite inconvenient.

SUMMARY OF THE INVENTION

It is an object of the invention to improve handling of a sniffing probe in environments which are difficult to access and poorly lit.

According to the invention, the sniffing probe comprises at its handle-piece an illumination device. The illumination device allows the environment of the sniffing probe to be illuminated if the user wishes to do so. The illumination device considerably facilitates work carried out with the sniffing probe in regions which are difficult to access and poorly lit. As compared with the use of a flashlight, the illumination device provided at the handle-piece offers the advantage that the environment of the handle-piece is always reliably illuminated and that the user has one hand free.

Preferably, the illumination device is configured such that exclusively a region distal to, i.e. axially in front of the gas inlet opening, is illuminated. Exclusive illumination of the region in front of the gas inlet opening results in illuminating only that region in which the sniffing probe is capable of detecting a leaking gas. The user has to guide the sniffing probe so close to the location to be inspected that a leaking gas prevailing at the location to be inspected can actually be taken in and detected by the sniffing probe. Further, the user is prevented from being blinded by the illumination device.

Preferably, only that region in front of the gas inlet opening is illuminated in which a leaking gas can be detected under the prevailing circumstances. For example, illumination may be effected by an illumination device which emits a light cone approximately corresponding to the intake cone.

According to a preferred aspect, the light emerges in the region of the gas inlet opening. Thus, the user is prevented to a large extent from being blinded, and exclusively the region distal to the gas inlet opening is illuminated.

Preferably, the illumination device comprises an LED as a light source, said LED preferably emitting white, i.e. almost colorless, light. The light source configured as an LED is characterized by low power consumption and relatively low heat development. Generally, a light bulb or a gas discharge lamp can also be used as a light source.

The light source may be arranged in the region of the sniffing opening. Alternatively, the light source may be disposed remote from the light outlet at a different location at the sniffing probe, wherein the light flows from the light source through a light conductor arranged at the sniffing probe to the light outlet. The light outlet may be annularly disposed around the gas inlet opening such that shadow casting is reduced or prevented.

According to a preferred embodiment, a ready-for-measurement switch is associated with the sniffing probe, said ready-for-measurement switch switching on the illumination device when the sniffing probe is ready for measurement, and switches off the illumination device when the sniffing probe is not ready for measurement. Thus the user can be prevented from erroneously assuming a readiness for measurement and a non-presence of leaking gas when the sniffing probe is not ready for measurement.

According to a preferred aspect, a limit value switch is associated with the sniffing probe, said limit value switch controlling the illumination device such that the illumination changes when a leaking gas concentration limit value is exceeded. This is a direct optical indication to the user that the concentration limit value is exceeded or not reached. For example, the limit value switch may change the illumination color from white to red when the leaking gas limit value is exceeded. Likewise, exceeding of the leaking gas limit value may be indicated by blinking of the illumination device.

Both the ready-for-measurement switch and the limit value switch may be arranged in a separate detection device, but may also be disposed in or at the sniffing probe handle-piece itself and may be correspondingly controlled by the detection device. The detection device may also be arranged at or integrated in the sniffing probe handle-piece.

BRIEF DESCRIPTION OF THE DRAWINGS

The invention will now be described in greater detail with reference to the drawings in which.

DETAILED DESCRIPTION

Figure 1:
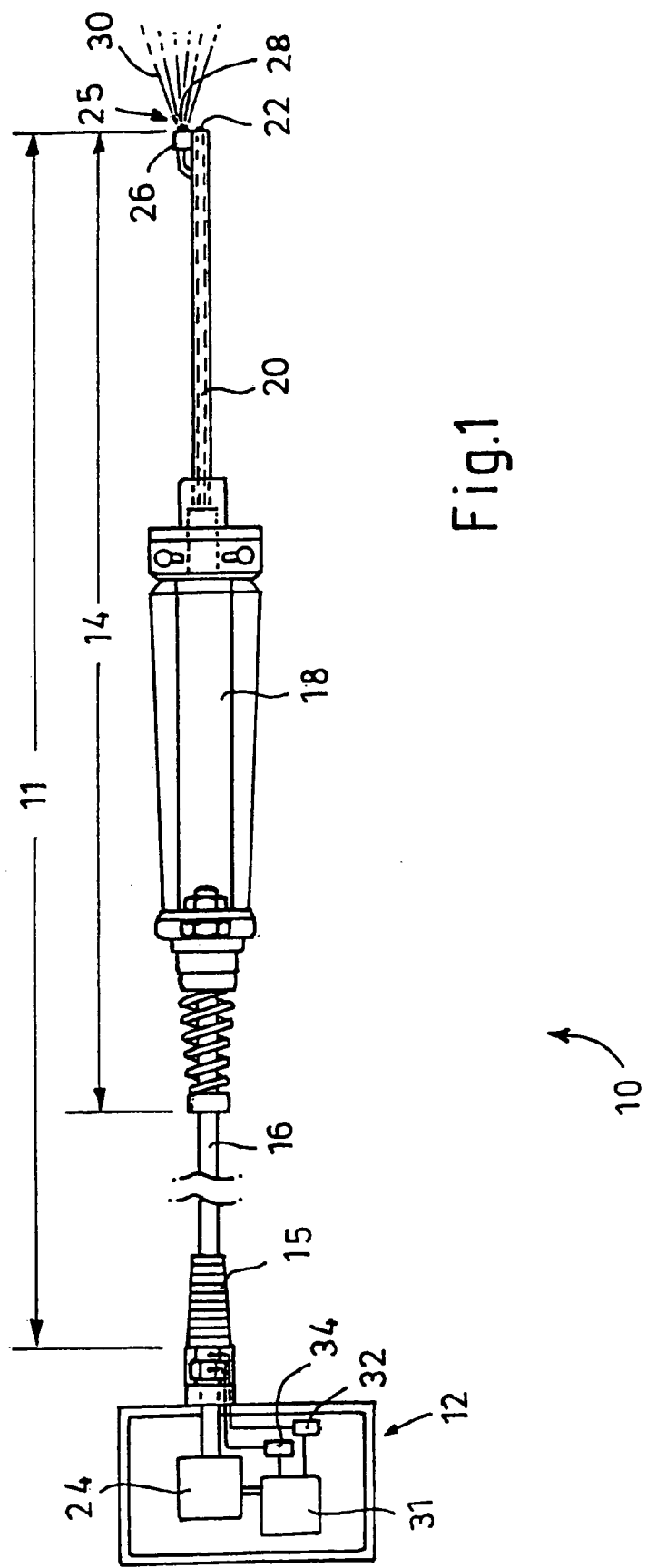
FIG. 1 shows a first embodiment of a sniffing probe handle-piece comprising a light source arranged in the region of the gas inlet opening.
Figure 2:
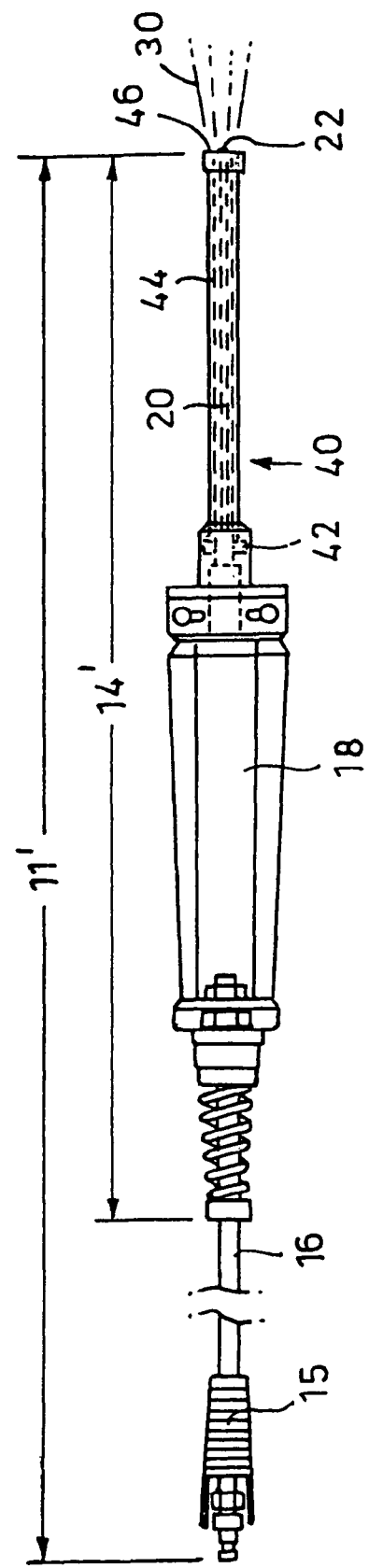
FIG. 2 shows a second embodiment of a sniffing probe handle-piece comprising a light source arranged remote from the gas inlet opening, and a light conductor.

FIG. 1 shows a sniffing assembly 10 essentially comprising a sniffing probe 11 and a separate detection device 12. FIG. 2 shows a second embodiment of a sniffing probe 11'.

The sniffing assembly 10 serves for localization of a gas leakage where a leaking gas escapes. Sniffing assemblies are in particular used for detecting leakages in cooling circuits of motor vehicle air conditioning units, refrigerators etc.

The sniffing probe 11 essentially comprises a handle-piece 14 and a flexible connecting line 16 connecting the handle-piece 14 with the detection device 12. The handle-piece 14 comprises a handhold 18, which has coaxially attached thereto a sniffing tube 20. The connecting line 16 has a length of 1-20 m, the handhold 18 is approximately 20 cm and the sniffing tube 20 is 5-50 cm long.

At the front distal end of the sniffing tube 20, a gas inlet opening 22 is arranged through which the ambient gas in taken in. The ambient gas is taken in via a corresponding vacuum pump in the detection device 12 and flows through a gas capillary in the sniffing tube 20, the handhold 18 and the connecting line 16 into a gas detector 24 of the detection device 12. The gas detector 24 determines whether the ambient gas taken in via the gas inlet opening 22 contains leaking gas, and/or determines the proportional content of leaking gas in the ambient gas taken in.

The sniffing probe 11 is detachably connected via a plug 15 with the detection device 12.

At the free end of the sniffing tube 20 comprising the gas inlet opening 22 an LED is provided as a light source 26 of an illumination device 25, wherein the light outlet 28 is arranged at the distal end of the sniffing tube 20. The light generated by the light source 26 emerges from the light outlet 28 in the form of a light cone 30 having a cone angle relative to the axial line of 10 degrees, for example.

The detection device 12 comprises a control device 31 which controls and checks all elements and operations of the sniffing assembly 10. The control device 31 is connected with the gas detector 24 as well as with a ready-for-measurement switch 32 and a limit value switch 34.

The ready-for-measurement switch 32 receives a ready-for-measurement signal from the control device 31 as long as the sniffing assembly 10 is ready for measurement, and it receives a not-ready signal when the sniffing assembly 10 is not ready for measurement, for example during the switch-on phase or when defects have been detected by the control device 31. Upon receipt of a ready-for-measurement signal the ready-for-measurement switch 32 switches on the illumination device 25, and it switches off the illumination device 25 when a not-ready signal has been received. This is a clear indication to the user as to whether the sniffing assembly 10 is ready for measurement. In this manner, the user is prevented from assuming, during non-readiness of the sniffing assembly 10, that the sniffing assembly 10 is ready for measurement and that the ambient gas does not contain leaking gas.

The limit value switch 34 switches the illumination device 25 to a different mode as soon as a limit value of the leaking gas concentration has been exceeded or not reached. For example, the light source 26 may emit light of a different color, e.g. red instead of white, when the limit value is exceeded. Alternatively or additionally, the light emitted by the light source may be intermittently emitted, whereas it is continuously emitted when the limit value is not reached. Thereby, exceeding of the limit value can be detected exactly at the location the user is looking at, and the gas leakage is likely to be found.

The sniffing probe 11' shown in FIG. 2 differs from the sniffing probe 11 shown in FIG. 1 only with regard to the illumination device 40. The illumination device 40 at the handle-piece 14' of the sniffing probe 11' shown in FIG. 2 essentially comprises a light source 42 arranged at the distal end of the handhold 18 or the proximal end of the sniffing tube 20, and a tubular cylindrical light conductor 44 coaxially disposed around the sniffing tube 20. The light conductor 44 comprises a light output 46 configured as a flat ring at its distal end, through which a light cone 48 emerges at a cone angle of approximately 10 degrees. The light source 42 may be composed of one or a plurality of LEDs. Instead of one or a plurality of LEDs a light bulb may serve as a light source. The light conductor 44 may be made from plastic material, for example Perspex.

The sniffing tube 20 and the light conductor 44 may be of rigid or flexible configuration.

By arrangement of an illumination device at the distal end of the sniffing tube 20, the region in which a gas leakage is supposed to be detected is well illuminated such that the objects to be inspected, for example pipes, seals, connectors etc., are easier to discern. It is not necessary to illuminate the whole measuring object. The light output at the distal end of the sniffing tube allows the user to easily determine and estimate the distance and the exact alignment of the sniffing tube and the gas inlet opening to the location to be inspected on the basis of the shape of the light cone and on the basis of the shadows cast.

The invention claimed is:

1. A hand-held sniffing probe for detecting a leaking gas, said probe comprising:
    a handle-piece having a gas inlet opening;
    an illumination device to illuminate distal to and axially in front of the gas inlet opening to localize and illuminate a source of the leaking gas, said illumination device being provided at the handle-piece; and
    a ready-for-measurement switch provided at the handle-piece, said ready-for measurement switch configured such that it switches on the illumination device when the sniffing probe is ready for measurement and switches off the illumination device when the sniffing probe is not ready for measurement, said ready-for-measurement switch being controlled by a detection device, wherein the detection device comprises a control device that sends a ready-for-measurement signal to the ready-for-measurement switch; said handle-piece being connected to the detection device through a flexible connecting line.

2. The hand-held sniffing probe according to claim 1, said ready-for-measurement switch to receive a ready-for-measurement signal from the control device to switch on said illumination device, and said ready-for-measurement switch to receive a not-ready signal to switch off said illumination device.

3. The hand-held sniffing probe according to claim 1, said ready-for-measurement switch to enable the illumination device to be activated by the detection device upon attaining a ready-for-measurement state.

4. The hand-held sniffing probe according to claim 1, wherein the illumination device outputs light to allow a user to determine and estimate distance and alignment of the gas inlet opening to a location to be inspected.

5. The hand-held sniffing probe according to claim 4 wherein the distance and the alignment are determined and estimated on the basis of the shape of a light cone of outputted light from the illumination device and on the basis of shadows cast by the outputted light.

6. The hand-held sniffing probe according to claim 1, wherein said sniffing probe has associated therewith a limit value switch to control the illumination device such that the illumination changes when a leaking gas limit value is exceeded.

* * * * *